United States Patent [19]

van Maanen

[11] 4,380,283
[45] Apr. 19, 1983

[54] DEVICE FOR PUSHING OBJECTS OFF A CONVEYOR

[75] Inventor: Johannes D. van Maanen, Berkel, Netherlands

[73] Assignee: Tevopharm-Schiedam B.V., Schiedam, Netherlands

[21] Appl. No.: 239,027

[22] Filed: Feb. 27, 1981

Related U.S. Application Data

[63] Continuation of Ser. No. 60,002, Jul. 24, 1979, abandoned, which is a continuation of Ser. No. 821,945, Aug. 4, 1977, abandoned.

[51] Int. Cl.³ .............................................. B65G 47/31
[52] U.S. Cl. .................................... 198/456; 198/461; 198/480; 198/723
[58] Field of Search ............... 198/480, 481, 461, 459, 198/456, 723, 432, 478, 322, 379

[56] References Cited

U.S. PATENT DOCUMENTS

| | | | |
|---|---|---|---|
| 1,696,360 | 12/1928 | Peyser . | |
| 2,739,695 | 3/1956 | Haylock | 198/34 |
| 2,744,608 | 5/1956 | Ardell et al. | 198/22 |
| 2,905,341 | 9/1959 | Anderson | 214/6 |
| 3,521,513 | 7/1970 | Gömann et al. | 198/480 X |
| 3,795,302 | 3/1974 | Schoppee | 198/432 |
| 3,899,069 | 8/1975 | Heinzer | 198/25 |
| 3,900,096 | 8/1975 | Nack et al. | 198/23 |

FOREIGN PATENT DOCUMENTS 2501267  3/1979  Fed. Rep. of Germany .

Primary Examiner—James G. Smith
Assistant Examiner—Douglas D. Watts

[57] ABSTRACT

A device for pushing objects lying end to end on an endless conveyor from the conveyor one at a time, including two parallel discs arranged on top of each other and with axes of rotation spaced apart in a vertical plane. A number of pins situated at equal distances from each other being pivotally secured in the upper disc as equal distances from its center, with a second set of pins being connected to the lower disc at the same radial distance from its center and with connecting members connecting the lower ends of the first set of pins to the upper ends of the second set of pins. Each pin of the second set of pins carrying at its lower end a push plate having a length shorter than the length of the objects to be pushed off. The discs overlap the conveyor in such a manner that when the discs are rotated the push plates will brush over the conveyor over a distance at least equal to the width b of the objects, while the radial distance between each pin and the center of the discs exceeds $(4b^2+1^2)/8b$.

3 Claims, 6 Drawing Figures

DEVICE FOR PUSHING OBJECTS OFF A CONVEYOR

This is a continuation of application Ser. No. 60,002, filed July 24, 1979 now abandoned which is a continuation of Ser. No. 821,945, filed Aug. 4, 1977, now abandoned.

The invention relates to a device for pushing objects lying end to end on an endless conveyor off from the conveyor, one at a time.

Such a device is particularly intended to serve as a feeding device for a packing machine, for example for packing sweets, in which said sweets are prepared in the shape of a strand which is then cut up into pieces which are carried on a conveyor to the packing machine but should be spaced apart before being packed so that there will be a space between each two pieces.

A known device of this type has forks and cams, as a result of which this device is fairly complicated and sensitive to disturbances.

The object of the invention is to provide a simple and reliable device of the kind mentioned before.

This is achieved by the device according to the invention, which consists of two discs parallel to each other and disposed in spaced apart relation on top of each other. The axes of the discs extending perpendicularly to their centers, being disposed in a vertical plane extending in spaced apart relation parallel to the conveyor and displaced with respect to each other. The discs can be set to rotate at equal speeds and in the same direction. A number of pins situated at equal distances from each other are pivotally secured in the upper disc at equal distances from its center and near its circumference, with the lower end of each of the pins being connected, by means of a connecting member extending parallel to the conveyor, with the upper end of a respective pin of an equal number of pins pivotally secured in the lower disc near its circumference at the same radial distances from its center as the first mentioned pins passing through said lower disc. Each pin carries at its lower end a push plate extending parallel to the connecting member and having a length not exceeding the length of the objects to be pushed off, with the distances in a straight line between the center lines of the pins equalling the length 1 of the objects. The discs overlap the conveyor in such a manner that, when the discs are rotating, the push plates will brush over the conveyor over a distance at least equal to the width b of the objects. The radial distance between each pin and the center of the disc exceeds $(4b^2 + 1^2)/8b$.

Preferably, the push plates form one leg of a rectangularly bent plate, the other leg of which is directed away from the conveyor.

Near that side of the conveyor which is directed away from the discs, a second conveyor may be provided, the latter conveyor being provided with carrier members situated at equal distances from each other, said distances exceeding the length of the objects.

The invention will now be described in more detail while referring to the drawing, in which.

Figure 1:
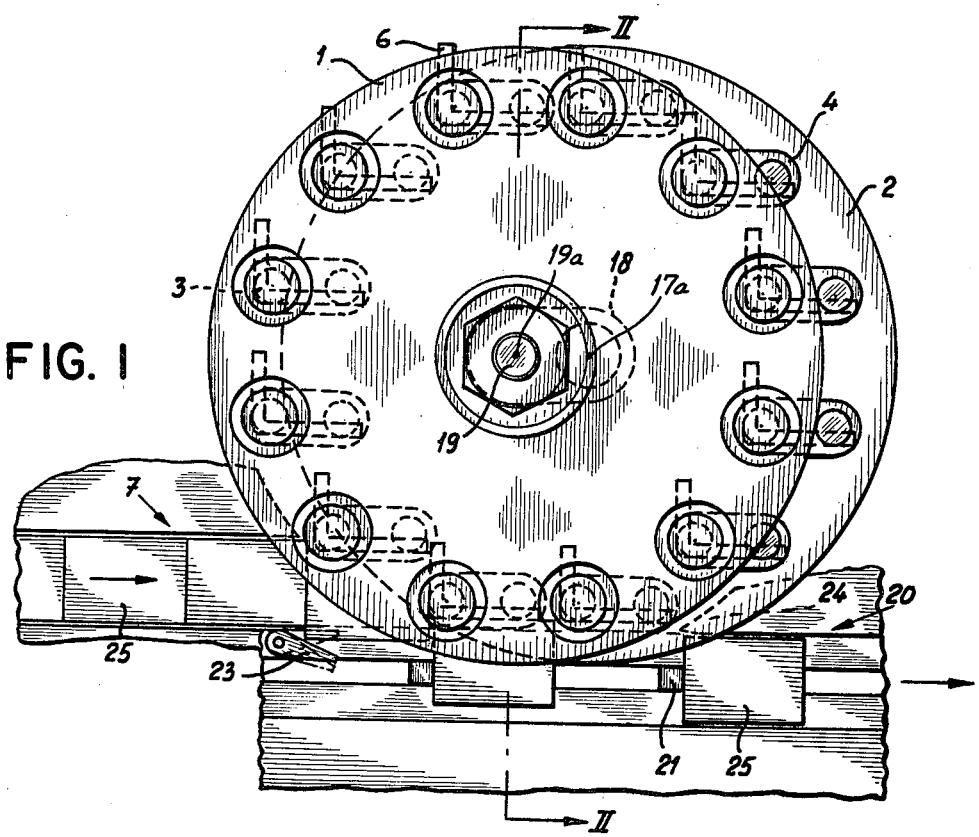
FIG. 1 is a top view of a device according to the invention.
Figure 2:
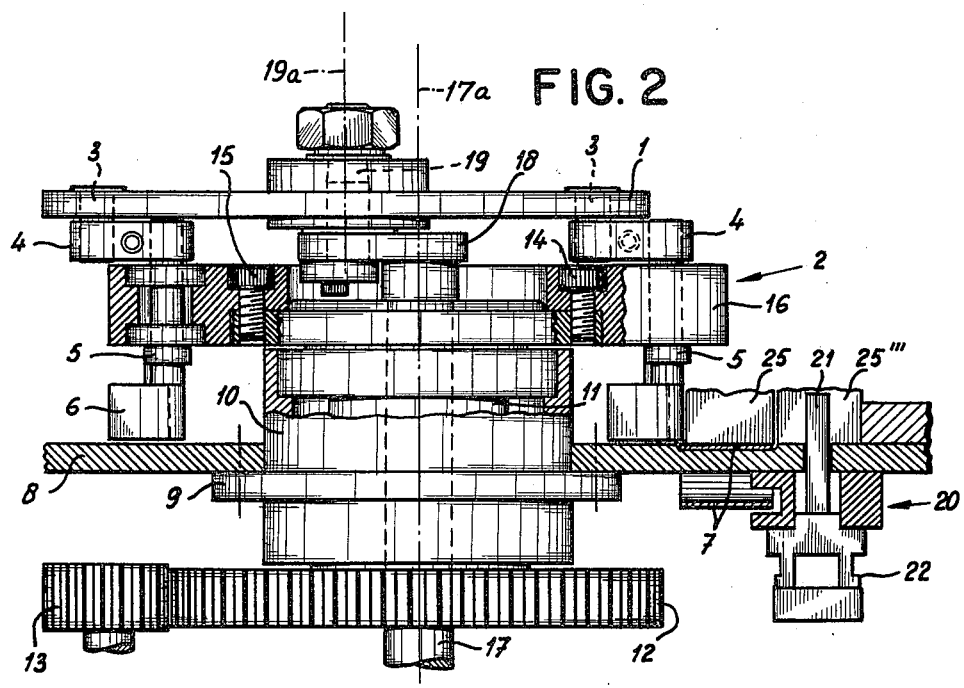
FIG. 2 is a cross section along the line II—II in FIG. 1.

As shown in FIGS. 1 and 2, the device according to the invention consists of an upper disc 1 and a lower disc 2. A number of pins 3 situated at equal distances from each other are pivotally secured in the disc 1, the lower ends of said pins being connected with the connecting members 4. At the other side, the connecting members 4 are connected with pins 5 pivotally passing through openings in the lower disc 2, the radial distances between the pins 3 and the center of the upper disc 1 equalling the radial distances between the pins 5 and the center of the lower disc 2. The lower ends of the pins 5 are provided with push plates 6 which, as shown in FIG. 1, are bent rectangularly, one leg extending parallel to the connecting member 4 and the other leg directed away from a conveyor 7.

The conveyor 7 extends over a table 8 to which a cylindrical housing 10 is secured through a flange member 9. In this cylindrical housing 10, a bushing 11 is rotatably mounted, the lower end of which is connected with a gear rim 12 meshing with a driven pinion 13. Near its top end, bushing 11 is provided with a flange 14 to which the ring 16 is secured by means of bolts 15. Furthermore, bushing 11 is mounted for rotation about a stationary shaft 17 by means of bearings, said shaft carrying an eccentric head 18 at its upper end, a shaft stump 19 being secured to said eccentric head and the upper disc 1 being journalled for rotation about said shaft stump. In this way, disc 2 is rotatable about a vertical axis 17a coinciding with the center of shaft 17, and disc 1 is rotatable about a vertical axis 19a coinciding with the center of the shaft stump 19.

Beside the conveyor 7, a second conveyor 20 is provided, comprising a number of carrier members 21 situated at equal distances from each other, protruding from a slit formed in the table 8 and mounted upon an endless chain 22.

As shown in FIG. 1, a reciprocating finger 23 is mounted near the conveyor 7, which finger can be driven in a manner to be explained later on. Also, a guide member 24 is provided.

The operation of the device will now be described with reference to FIG. 3.

Figure 3C:
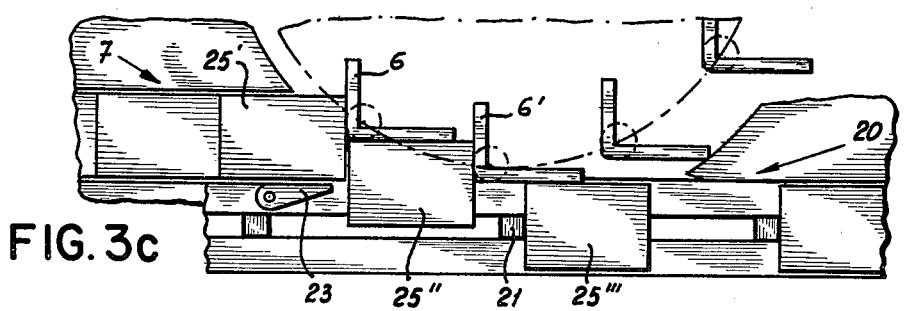
FIGS. 3a–3d show schematically the operation of the device according to FIGS. 1 and 2.
Figure 3D:
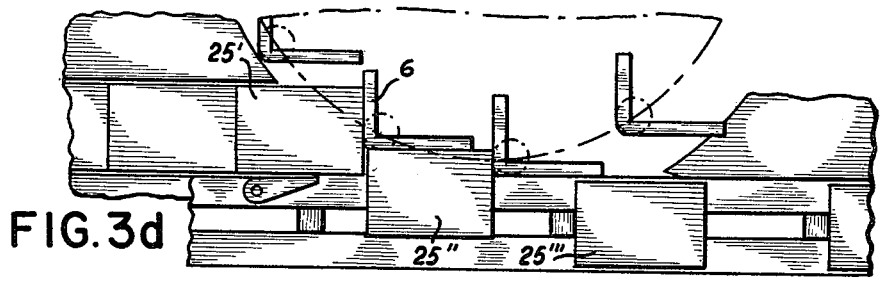
Figure 3A:
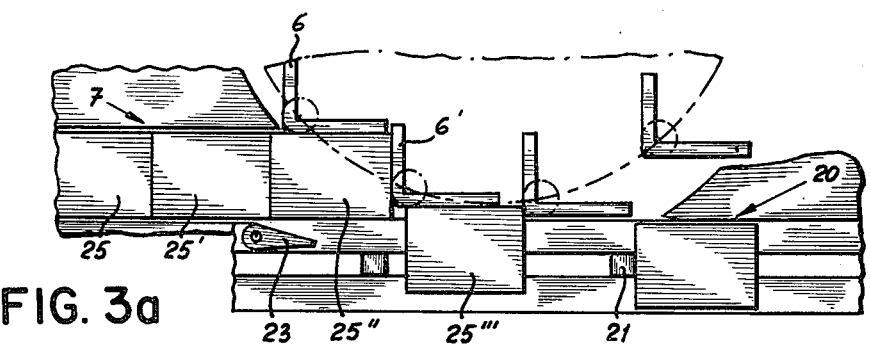

As shown in FIG. 3a, the leading object 25" of a plurality of objects 25 disposed in end to end relation and continuously supplied by the conveyor 7, is situated against one leg of the push plate 6' while the other leg of the push plate 6 bears against the side of said object 25". The other leg of the push plate 6' has already for the greater part pushed the object 25''' onto the conveyor 20. The reciprocating member 23 moves downwardly in the figure to release the object 25".

Figure 3B:
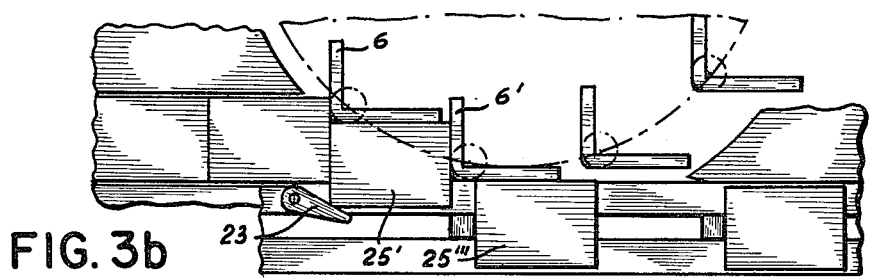

In FIG. 3b, the object 25" has already been partly pushed downwardly by pressure plate 6 while the object 25''' has been practically entirely pushed on to the conveyor 20 and caught by the carrier member 21.

In FIG. 3c, the object 25" has been pushed further onto the conveyor 20 and has meanwhile passed the reciprocating member 23 which member has swung backwardly so as to create a support for the object 25' in order to prevent this object from overturning owing to the object bearing against the one leg of push plate 6 moving downwardly.

In FIG. 3d, the object 25" is situated in the path of the catches 21 while the object 25''' is on its way to the packing machine.

FIGS. 3a to 3d clearly indicate that the objects 25 lying end to end which are continuously supplied to the conveyor 7 are being pushed between the catches 21 of the conveyor 20 by the device according to the invention, as a result of which the objects 25 can be transferred to the packing machine in spaced apart relation.

I claim:

1. A device for pushing objects having a length l and a width b and lying end to end on a conveyor, essentially horizontally off from said conveyor one at a time so that they become separated from each other, said device comprising: two discs arranged parallel to and in spaced relationship to each other and one on top of the other, said discs being rotatable about axes of rotation extending perpendicular to their centers, said axes being disposed in a substantially vertical plane extending in spaced relationship parallel to said conveyor and said axes being offset with respect to each other in said vertical plane, a plurality of first pins situated at equal distances from each other and pivotally secured in the upper one of said two discs at equal distances from the center of said upper disc and relatively near the circumference of said upper disc, a plurality of second pins corresponding in number to said plurality of first pins and being pivotally secured in the lower one of said two discs relatively near its circumference and at the same radial distances from its center as the first pins are from the center of the upper disc, a plurality of connecting members respectively connecting the lower ends of the plurality of first pins with the upper ends of the plurality of second pins, said second pins extending through said lower disc, a plurality of push plates respectively connected to the lower ends of said second pins, each of said push plates forming one leg of a rectangularly bent plate, the other leg of said bent plate being directed transverse to said conveyor, each of said push plates having a length not exceeding the length l of the objects to be pushed off, the distances in a straight line between the center lines of the second pins equaling said length l of the objects, said discs overlapping said conveyor to such an extent that when the discs are rotating the push plates will brush over the conveyor over a distance at least equal to said width b of the objects, the radial distance between each pin and the center of the disc to which it is connected exceeding $(4b^2 + l^2)/8b$.

2. A device according to claim 1, comprising a second conveyor arranged more remote from said two discs than said first-mentioned conveyor, and a plurality of carrier members associated with said second conveyor and arranged at equal distances from each other, said distances exceeding the length of said objects.

3. A device for pushing objects lying in abutting engagement on a conveyor, off from said conveyor essentially horizontally one at a time so that the objects become separated from each other, said device comprising: two discs arranged parallel to and in spaced relationship to each other and one on top of the other, said discs being rotatable about axes of rotation extending perpendicular to their centers, said axes being disposed in a substantially vertical plane extending in spaced relationship parallel to said conveyor, and said axes being offset with respect to each other in said vertical plane, a plurality of first pins situated at equal distances from each other and pivotally secured in the upper one of said two discs at equal distances from the center of said upper disc and relatively near the circumference of said upper disc, a plurality of second pins corresponding in number to said plurality of first pins and being pivotally secured in the lower one of said two discs relatively near its circumference and at the same radial distances from its center as the first pins are from the center of the upper disc, a plurality of connecting members respectively connecting the lower ends of the plurality of first pins with the upper ends of the plurality of second pins, said second pins extending through said lower disc, a plurality of pusher means respectively connected to the lower ends of said second pins, each of said pusher means forming one portion of a plate, another portion of which extends substantially transverse to said conveyor, each of said push plates having a length not exceeding the length of the objects to be pushed off, the distances in a straight line between the center lines of the second pins equalling said length of the objects, said discs overlapping said conveyor to such an extent that when the discs are rotating said pusher means will brush over the conveyor over a distance at least equal to the width of the objects.

* * * * *